(12) United States Patent
Courtemanche

(10) Patent No.: US 6,935,708 B2
(45) Date of Patent: Aug. 30, 2005

(54) TRACK FOR ALL TERRAIN VEHICLE

(75) Inventor: Denis Courtemanche, Richmond (CA)

(73) Assignee: Camoplast Inc., Quebec (CA)

( * ) Notice: Subject to any disclaimer, the term of this patent is extended or adjusted under 35 U.S.C. 154(b) by 0 days.

(21) Appl. No.: 10/669,228

(22) Filed: Sep. 24, 2003

(65) Prior Publication Data
US 2004/0084962 A1 May 6, 2004

(30) Foreign Application Priority Data
Oct. 1, 2002 (CA) .............................. 2405908

(51) Int. Cl.⁷ .................................. B62D 55/24
(52) U.S. Cl. ............................. 305/165; 305/178
(58) Field of Search ..................... 305/165, 178, 305/185, 53, 193, 158, 168, 180, 179, 146, 151, 191; 180/9, 9.1, 9.3, 10; 152/209.28

(56) References Cited
U.S. PATENT DOCUMENTS

| | | | | |
|---|---|---|---|---|
| 3,976,025 A | * | 8/1976 | Russell ...................... 305/165 |
| 6,065,818 A | * | 5/2000 | Fischer ....................... 305/179 |
| 6,079,802 A | * | 6/2000 | Nishimura et al. ......... 305/157 |
| 6,241,327 B1 | * | 6/2001 | Gleasman et al. ......... 305/157 |
| 6,406,106 B1 | * | 6/2002 | Moss .......................... 305/165 |
| 6,505,896 B1 | * | 1/2003 | Boivin et al. ............... 305/178 |
| 6,742,852 B2 | * | 6/2004 | Tsuru et al. ................ 305/170 |
| 2004/0227401 A1 | * | 11/2004 | Courtemanche ............ 305/165 |

* cited by examiner

Primary Examiner—Russell D. Stormer
Assistant Examiner—Jason R. Bellinger
(74) Attorney, Agent, or Firm—Merchant & Gould P.C.

(57) ABSTRACT

A track for a vehicle travelling on all terrain, especially those displaying ruts, is formed of an endless longitudinal body displaying a series of longitudinally spaced drive lugs on its inner surface and a series of longitudinally spaced profiles on its outer surface. Each profile displays a height decreasing in value from the center of the body to the outer edge thereof. The body is formed of flexible rubber material and is free of conventional transversally extending reinforcing embedded rods thus providing reduced transverse rigidity to the body and allowing the body to curvingly flex when engage in ruts.

1 Claim, 3 Drawing Sheets

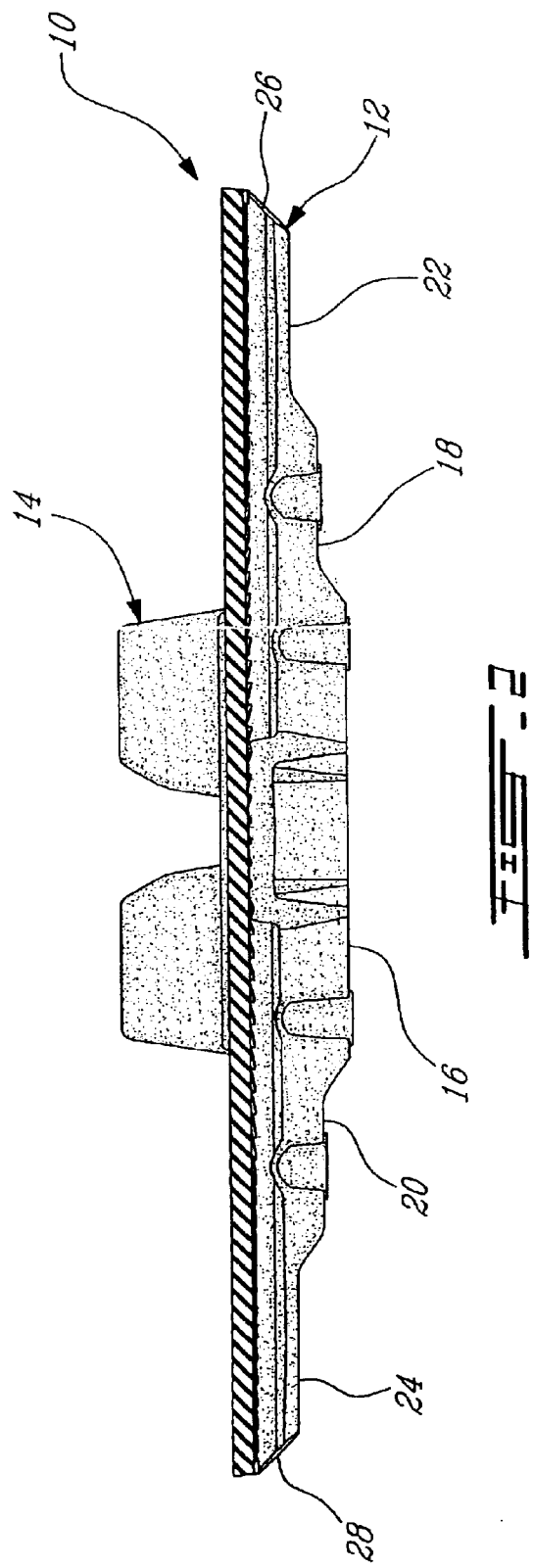

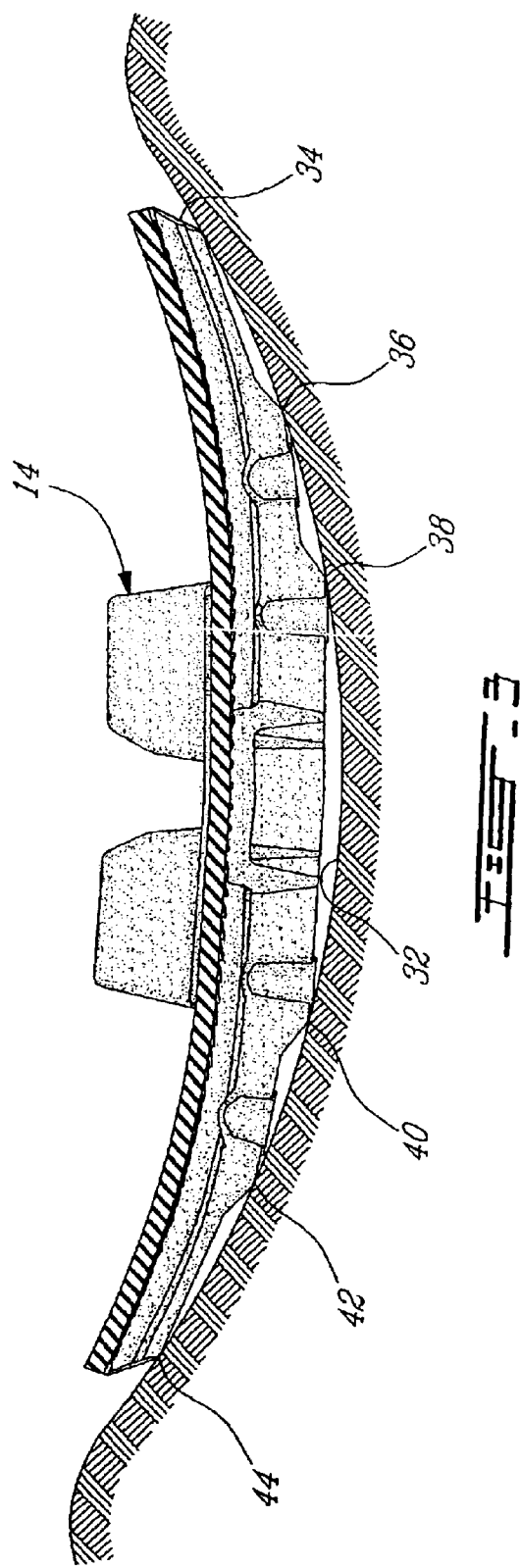

TRACK FOR ALL TERRAIN VEHICLE

FIELD OF THE INVENTION

The present invention relates to a track for a vehicle travelling on all terrain and particularly adapted to terrains that have ruts formed therein.

BACKGROUND OF THE INVENTION

Endless tracks are well known in the art of vehicles that travel on all sorts of rough terrain.

Traditionally, two types of all terrain vehicles are proposed, either the wheel type or the track type. Tracks for all terrain vehicles are defined by an assembly consisting of a frame that maintains the tension of the endless track and prevents it from loosening. These vehicles must be manoeuvered and be effective upon a variety of unstable or uneven surfaces. However, the track assembly must be so designed as to maintain tension upon the endless track to keep it in its due course and prevent accidental loosening while at the same reducing damages inflicted on the terrain.

Conventional tracks are formed of an endless body which displays a series of longitudinally spaced drive lugs on its inner surface and a series of longitudinally spaced profiles on its outer surface. The body of the track is formed of flexible rubber material and is provided with a series of transversely extending reinforcing rods which are embedded in the rubber material to reinforce it transversally. These rods are longitudinally spaced from one another and are usually located in the track at the location of the profiles. Thus, the presence of these embedded rods provides transverse rigidity to the body ensuring it that the track maintains an overall contact of its outer surface to the ground over which it travels.

It has been found, however, that such tracks having reinforcing rods embedded therein lack traction whenever the track travel in terrains that have ruts, whether or not the surface of the ground is covered with snow or not.

OBJECT OF THE PRESENT INVENTION

It is an object of the present invention to provide a track which overcomes the above problem whenever a track is engaged into the ruts of a terrain.

The present invention is therefore concerned with maintaining the flexibility of the track so that the track will conform to the configuration of the rut.

The present invention therefore relates to a track for a vehicle travelling on all terrain, including ruts, the track comprising an endless longitudinal body having an inner surface displaying a series of longitudinally spaced drive lugs and a outer surface displaying a series of longitudinally spaced profiles; each profile displays a height decreasing in value from the center of the body to its outer edges; the body is formed of flexible rubber material and is free of conventional transversally extending reinforcing embedded rods thereby providing to the body reduced transverse rigidity and allowing it to curvingly flex when engaged in ruts.

The present invention is also concerned with providing a profile configuration to the outer surface of the track which, when the track is engaged in a rut, will have maximum traction. Therefore, each profile is formed of three levels of sections which have a height that decreases in value from the center of the body to the outer edge thereof.

Other objects and further scope of applicability of the present invention will become apparent from the detailed description given hereinafter. It should be understood, however, that this detailed description, while indicating preferred embodiments of the invention, is given by way of illustration only, since various changes and modifications within the spirit and scope of the invention will become apparent to those skilled in the art.

BRIEF DESCRIPTION OF THE DRAWINGS

FIG. 2 is a transverse cross-sectional view of the track; and

FIG. 3 is a transverse cross-sectional view of the track when engaged in a rut.

DESCRIPTION OF PREFERRED EMBODIMENTS

Figure 1:
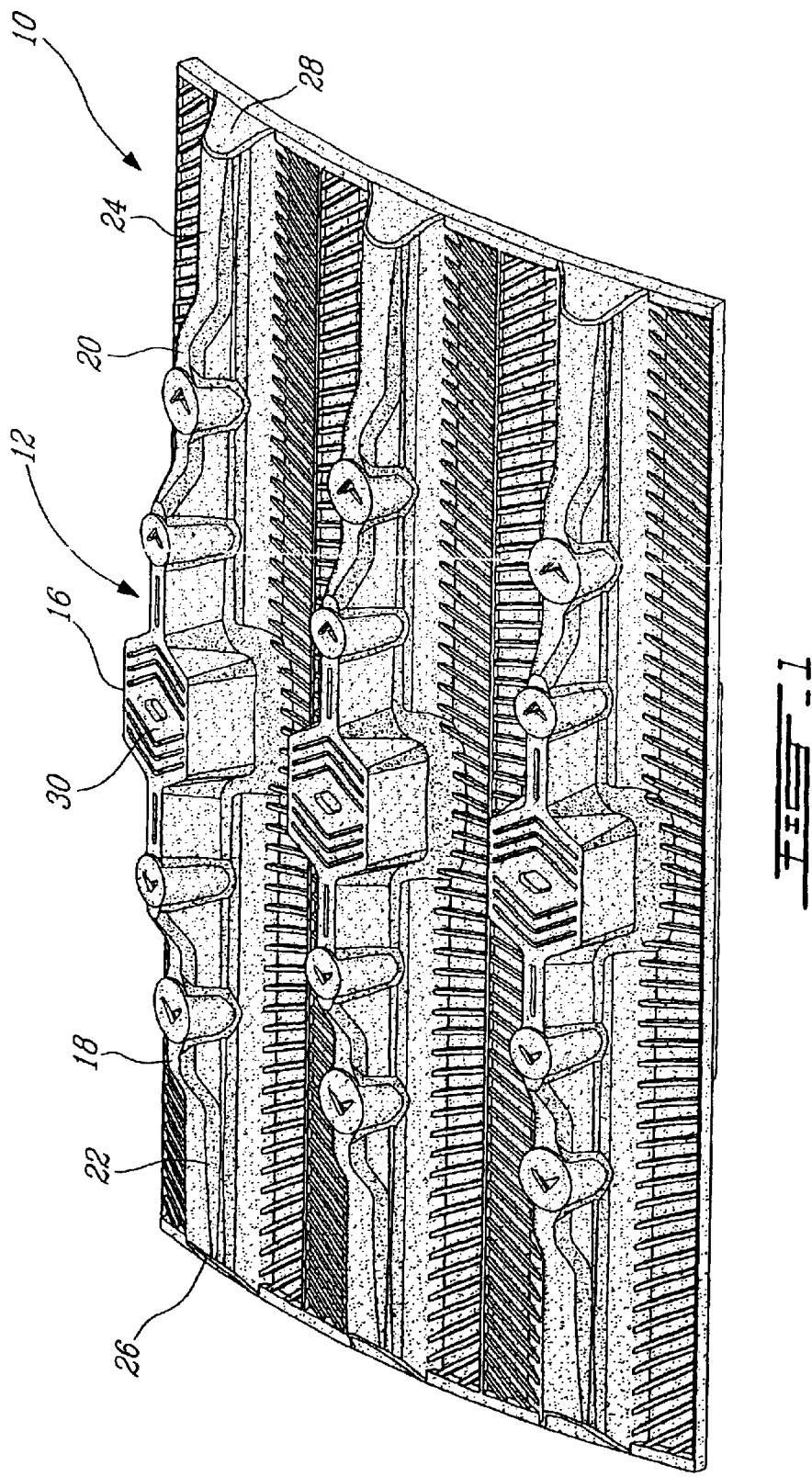
FIG. 1 is a perspective view of a segment of an endless track made in accordance with the present invention.

FIG. 1 of the appended drawings illustrates a segment 10 of an endless track which can be mounted on various types of vehicles, such as snowmobiles, all terrain vehicles, agricultural vehicles or the like.

Referring also to FIG. 2, the endless track is formed, on its outer surface, with a series of longitudinally spaced profiles 12 and, on its inner surface of a series of longitudinally spaced drive lugs 14 which are used to be engaged by drive sprockets (not shown) of the drive track assembly.

As seen in FIG. 2, each profile is formed of three levels each having a differing height. The profile 12 has a central section 16, a pair of opposite intermediate sections 18 and 20 and a pair of edge sections 22 and 24. The thickness of the central section 16 is greater than the thickness of the intermediate sections 18 and 20, the latter having a thickness greater than the thickness of the edge sections 22 and 24. The latter have respective chamfered ends 26 and 28.

In the embodiment illustrated, the central section 16 includes a massive hexagonal shape 30 to provide maximum traction in the central area of the track.

Conventional tracks include, embedded in the rubber material of the body and in the region of the profiles, reinforcing rods, either metallic or plastic, to provide transverse rigidity to the track. However, in order to provide traction whenever a track is engaged in a rut 32, such as illustrated in FIG. 3, the object of the present invention is to eliminate any reinforcement transversally of the body so that the track may flex in the rut to provide a series of contact points, such as 34, 36, 38, 40, 42 and 44.

Although the invention has been described above with respect to one specific form, it will be evident to a person skilled in the art that it may be modified and refined in various ways. It is therefore wished to have it understood that the present invention should not be limited in scope except by the terms of the following claims.

What is claimed is:

1. A track for a vehicle traveling on all terrain, including ruts, comprising an endless longitudinal body having an inner surface displaying a series of longitudinally spaced drive lugs and an outer surface displaying a series of longitudinally spaced profiles extending transversely from one outer edge of said body to an opposite outer edge of said body; each said profile being formed of a continuous mass of flexible rubber material, each continuous mass displaying a height decreasing in value from the center of the mass to said outer edges thereof; said body being formed of flexible rubber material and being free of conventional transversely extending reinforcing embedded rods thereby providing reduced transverse rigidity to the body and allowing said body and said profiles to curvingly flex when engaged in ruts, wherein each said profile is formed of three levels of profile sections including a central section, a pair of opposite intermediate sections and a pair of opposite edge sections, and wherein said central section displays a hexagonal shaped mass having a thickness greater than the thickness of said intermediate sections and said edge sections of said profile.

* * * * *